Jan. 4, 1949.　　　　J. P. WALKER　　　　2,457,959
FILTERING TANK FOR WATER DISPOSAL SYSTEMS
Filed Jan. 19, 1942　　　　　　　　　　　　　　6 Sheets-Sheet 6

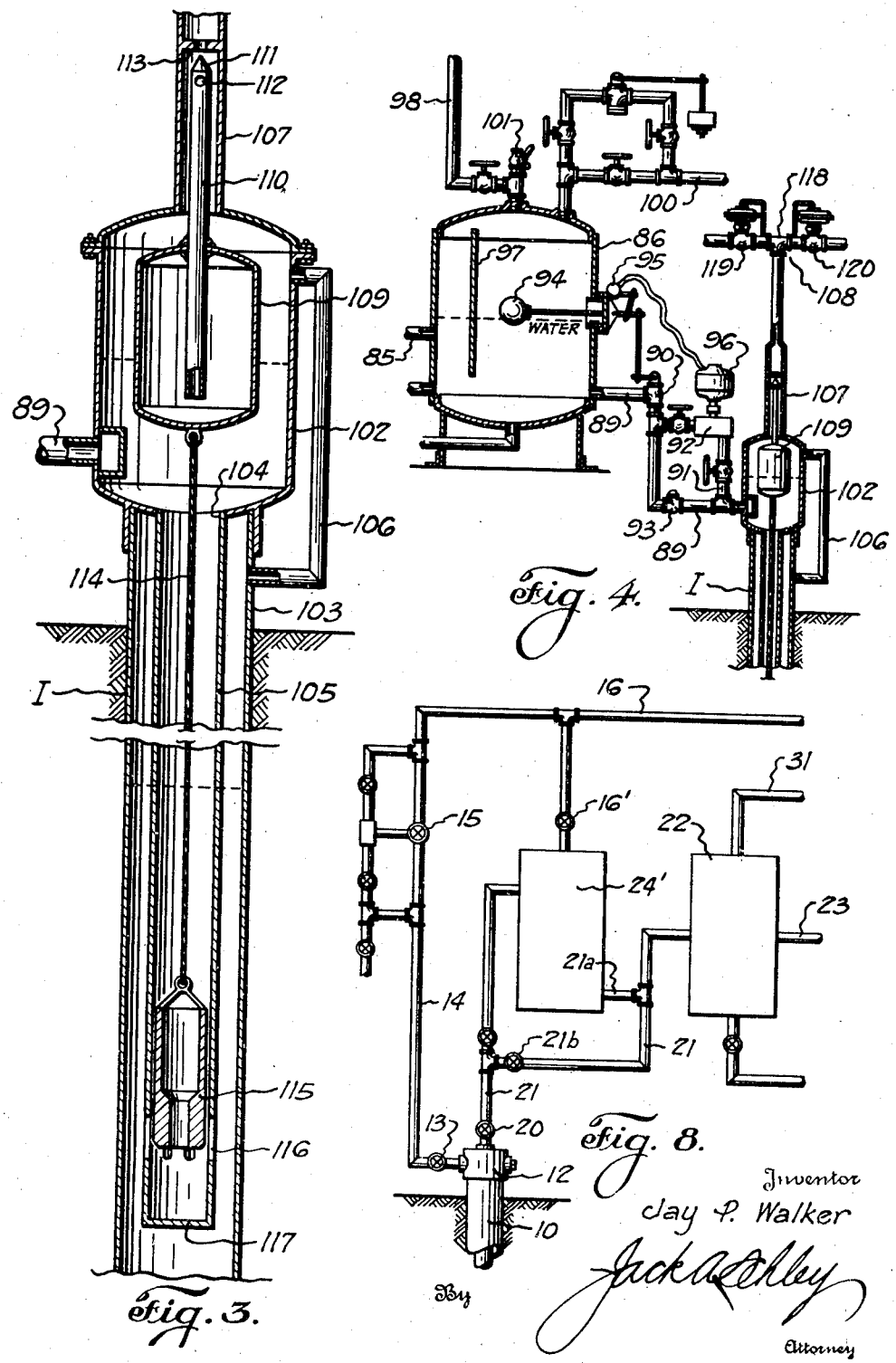

Inventor
Jay P. Walker
By Jack A. Ashley
Attorney

Patented Jan. 4, 1949

2,457,959

UNITED STATES PATENT OFFICE 2,457,959

FILTERING TANK FOR WATER DISPOSAL SYSTEMS

Jay P. Walker, Tulsa, Okla., assignor to National Tank Company, Tulsa, Okla., a corporation of Nevada Application January 19, 1942, Serial No. 427,330

3 Claims. (Cl. 210—49)

This invention relates to new and useful improvements in water disposal systems.

The invention has particularly to do with an efficient and economical system of disposing of salt water or other water produced with oil and/or gas from oil wells.

One object of the invention is to provide an improved system wherein the operation is carried out in a closed cycle, blanketed by a hydrocarbon gas under pressure above atmospheric, or with a blanket of hydrocarbon gas under partial atmospheric pressure or below atmospheric pressure, thereby avoiding the exposure of the water to the atmosphere and thus preventing aeration which would cause precipitation of iron or other pore clogging solids, when the water is returned or injected into a disposal formation.

A particular object of the invention is to provide a water disposal or injection system wherein a blanket of gas is maintained throughout such system from the source well to the input well, and in which system an emulsion treater is connected so that the oil may be carried out of the system and the residual water carried through the system to the input well and injected into the disposal formation without the use of a valvular control in the input well; such system including a water storage or surge vessel and if desired a filter.

Still another object of the invention is to provide an improved system of the character described, whereby the water may be cascaded or permitted to flow freely down the tubing of the input well; or wherein the disposal water may be forced into the disposal formation by a surface pump controlled by the water level in the storage or filter vessel.

Still another object of the invention is to provide an improved automatic valve mechanism for controlling the discharge of the input water into the formation.

A still further object of the invention is to provide an improved water accumulating receptacle for use in a disposal system.

A construction designed to carry out the invention will be hereinafter described, together with other features of the invention.

Figure 1:
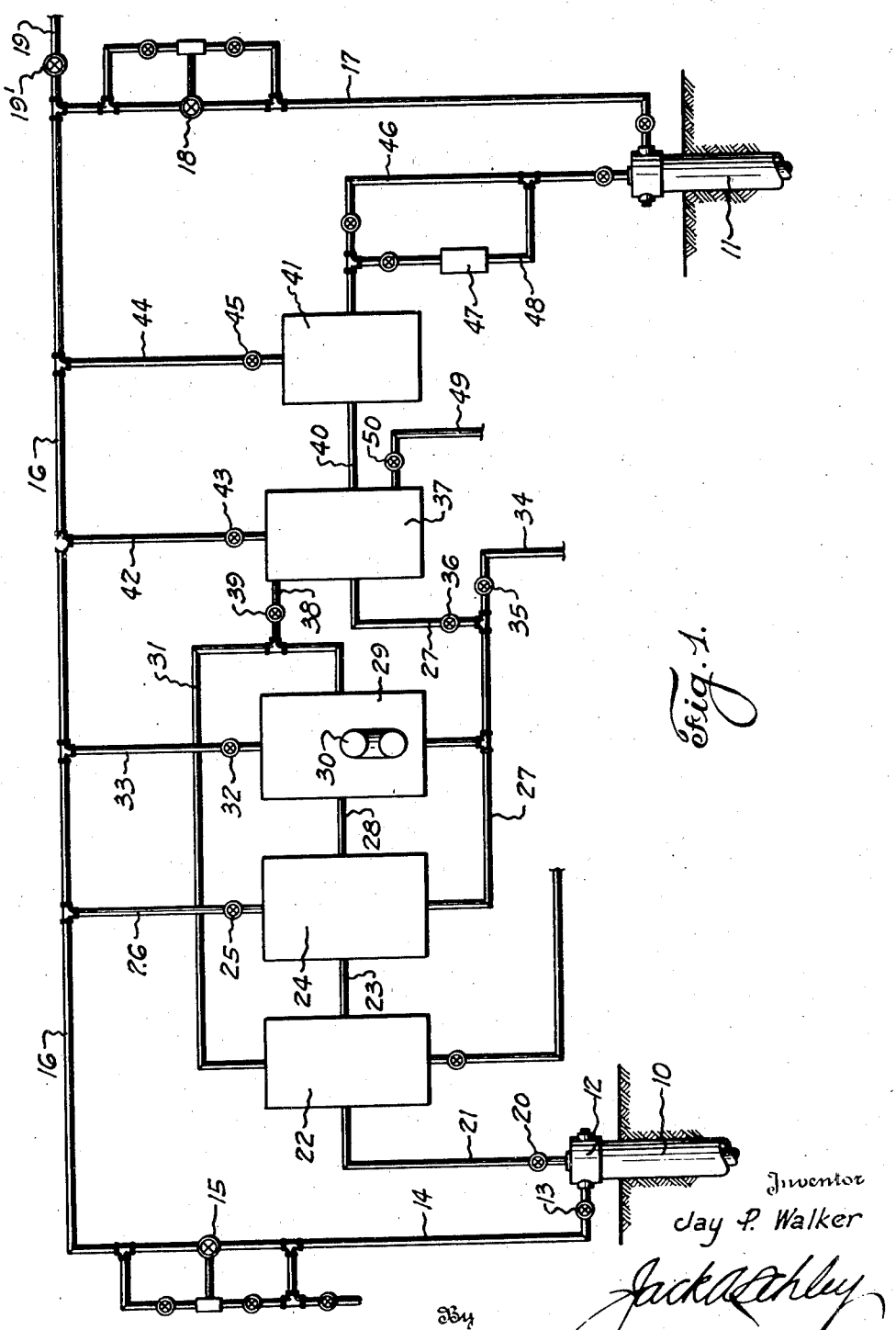
Figure 2:
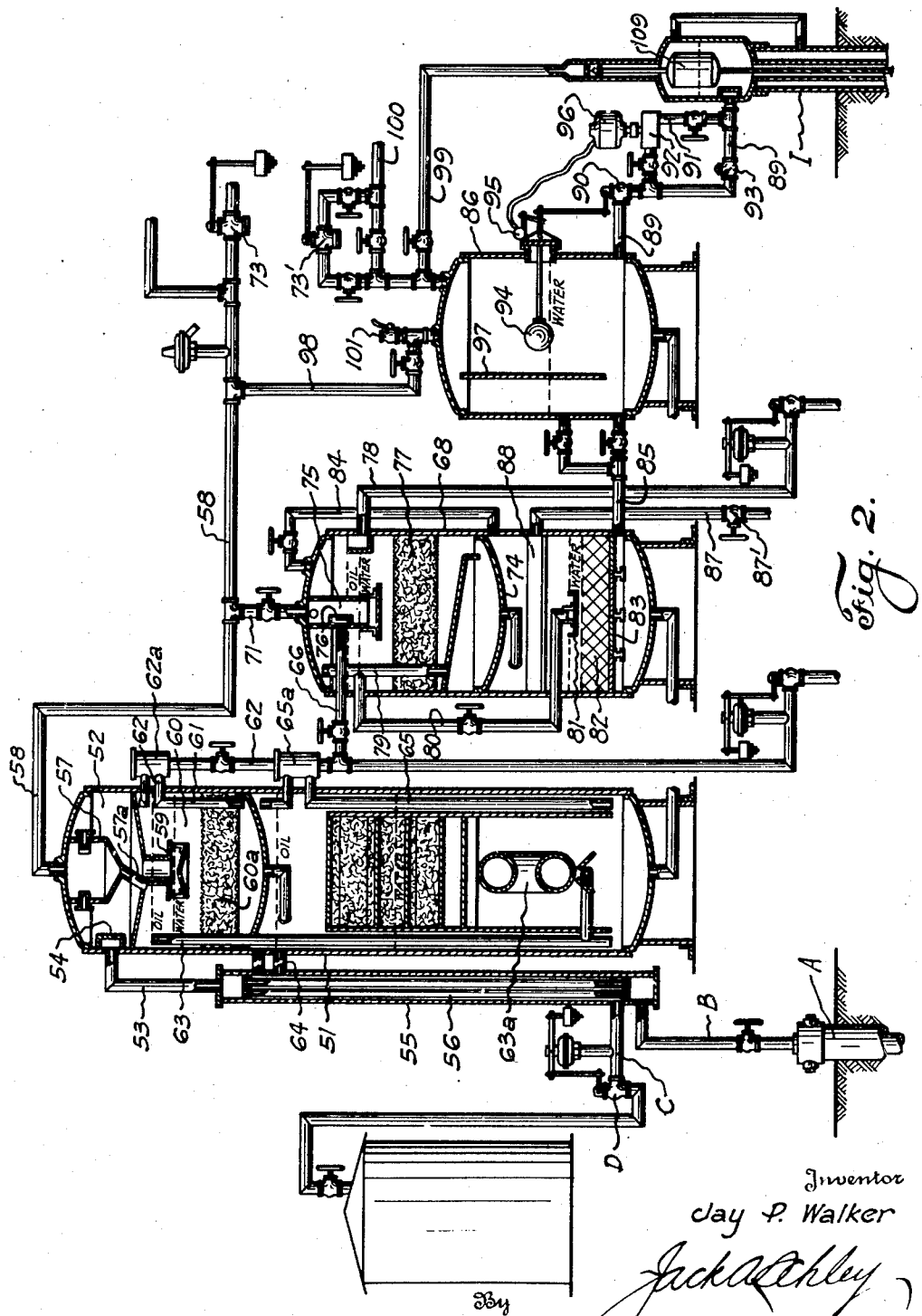
Figure 5:
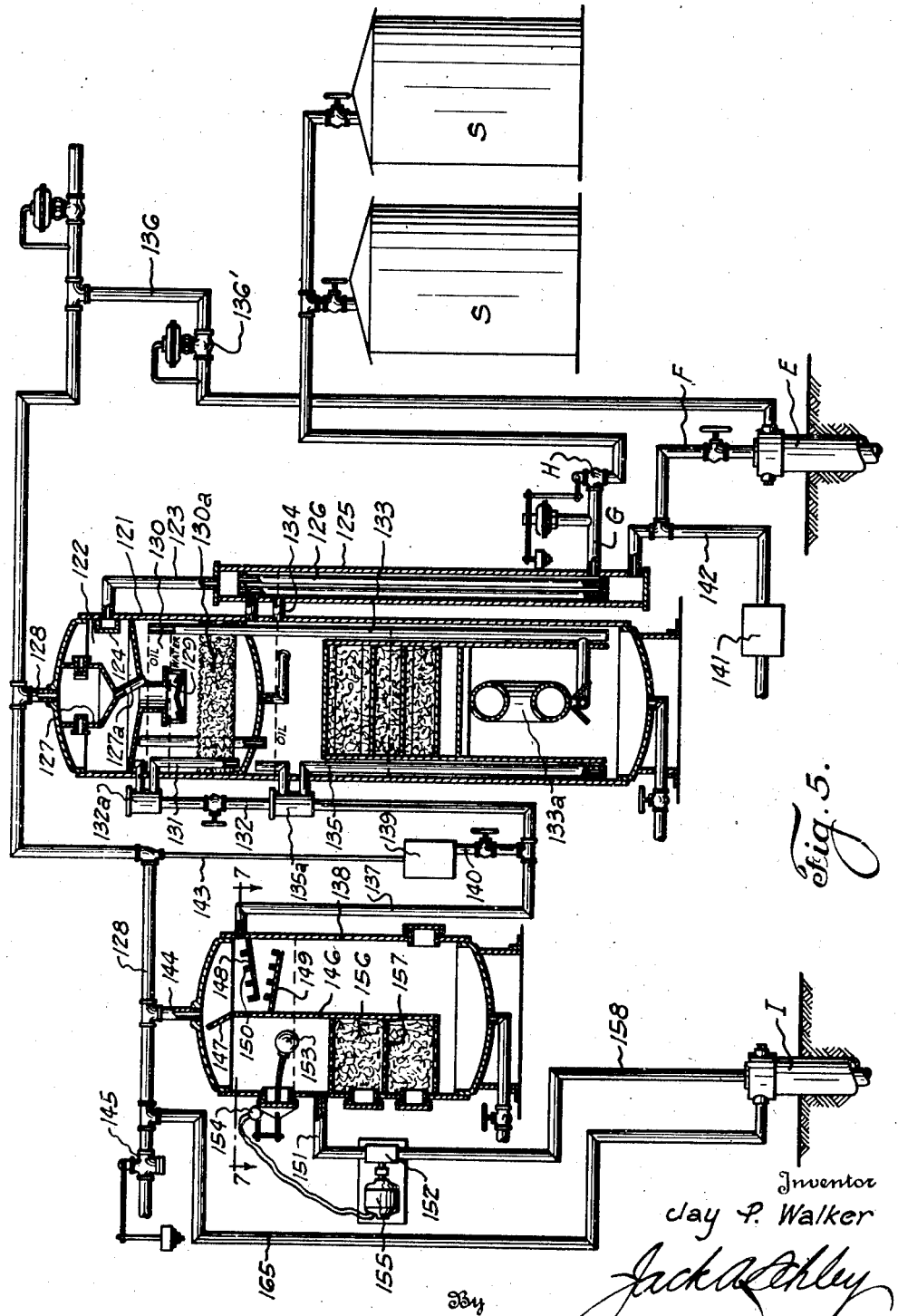
Figures 6, 7:
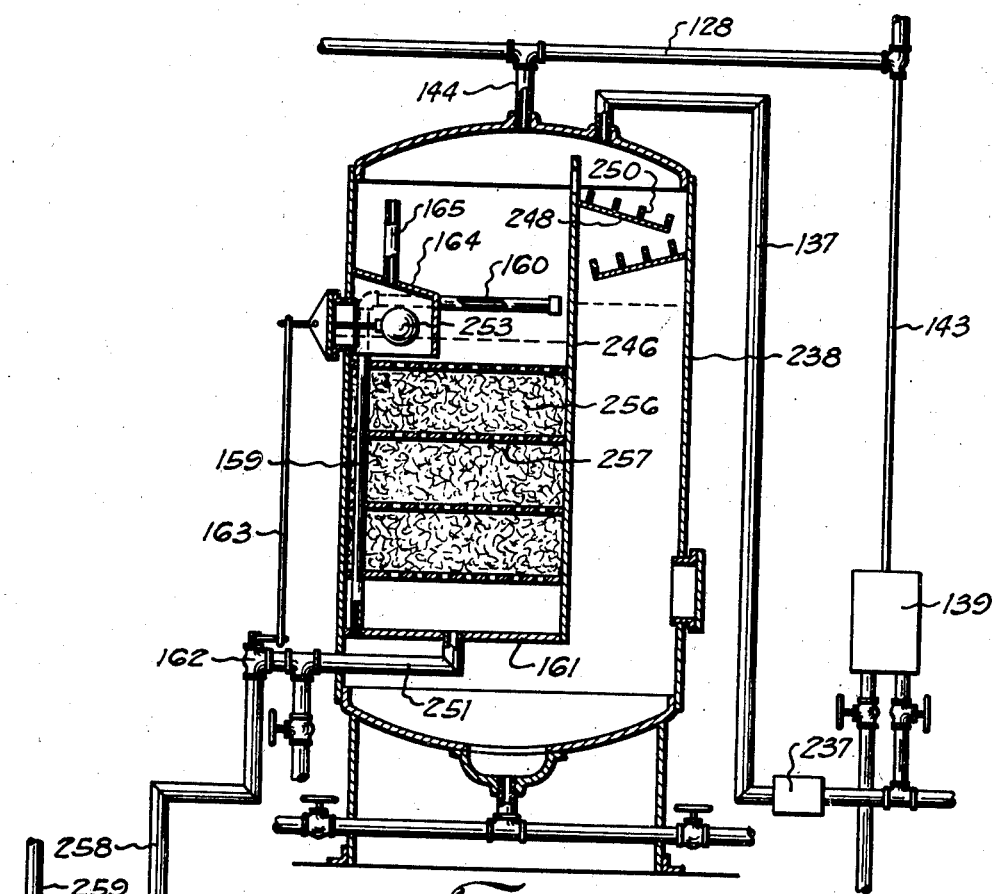
Figure 9:
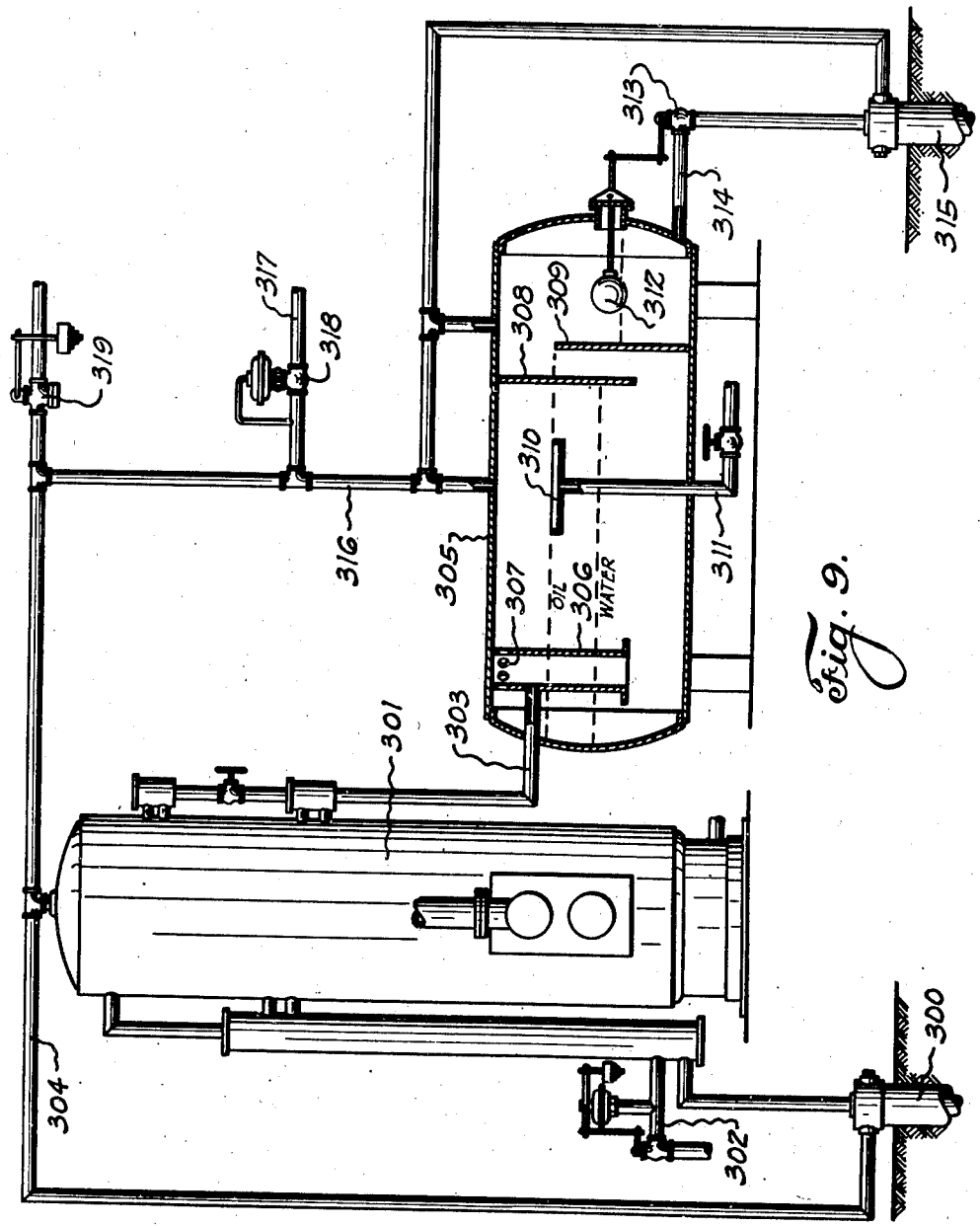

The invention will be more readily understood from a reading of the following specification and by reference to the accompanying drawings, in which an example of the invention is shown, and wherein:

Figure 1 is a schematic view of a system for carrying out the invention,

Figure 2 is a view, partly in elevation and partly in section, showing the details of a system such as is shown in Figure 1, Figure 3 is an enlarged, vertical, sectional view, of the disposal well structure, Figure 4 is a fragmentary view, similar to portions of Figure 2, showing an alternate method of connecting the disposal well, Figure 5 is a view similar to Figure 2, showing a modification of the system, Figure 6 is an enlarged, vertical, sectional view showing a modification of the filter tank, Figure 7 is a horizontal, cross-sectional view taken on the line 7—7 of Figure 5, Figure 8 is a schematic view of a modified form of one portion of the system as shown in Figure 1, wherein an oil and gas separator is utilized, and Figure 9 is a view, partly in elevation and partly in section, of a further modification of the invention, in which filtering of the disposal water is not utilized.

This application is filed as a continuation-in-part of my co-pending application, Serial No. 349,521, filed August 2, 1940, now abandoned.

In the drawings, in Figure 1, the numeral 10 designates a well which is producing oil and gas and water. These components of the well stream may vary in proportion, since wells in various locations and fields differ as to their gas-oil ratio, and their water-oil ratio. Nearly every well, however, produces water either from the time it is first completed, or after quantities of oil are produced therefrom. A fact which holds true with most wells, is that as the well becomes older, and as oil is produced therefrom, the water-oil ratio increases, so that more water is produced per barrel of oil produced. As stated hereinbefore, suitable disposal must be made of this water, and the most suitable method of disposition developed so far is the flowing of the water into a disposal well whose exposed and open porous section into which the water is introduced is that same formation or reservoir from which such water has been produced with the oil, such as the well 11 in Figure 1.

To carry out this disposition more efficiently, and with a minimum of expense, and still adhere to state laws and good practice in general, the water must be separated from the oil, and conducted into the input or disposal well 11; and be protected at all times, from the time of its production in the well 10 until it enters the formations in the well 11, from any conditions, such as aeration, excess heating, which tends to change greater quantities of solids from the solution to the suspension phase, etc., which will render it unsuitable for injection into the well 11, or necessitate additional handling or processing to place the water in a suitable condition for injection.

As before pointed out, it has been found that aeration throughout the entire system must be precluded; also in instances iron salts must be removed before the water is delivered to the input well. It is desirable to protect the disposal water from excess heat because excess heat drives off undesirable quantities of carbon dioxide from the water. By actual use of the system over a period of years it has been found that cascading of the water discharged down the input well is not objectionable and apparently does not interfere with absorption of the water by the input formation.

In Figure 1, there is shown schematically a system for handling the salt water produced with oil from wells, in which system provisions are made for preventing the subjection of the water to the undesirable conditions enumerated hereinbefore, and in which provisions are made for removing portions of dissolved salts from the water when the nature of the latter renders such a procedure advisable.

The well 10 is provided with the usual casing or tubing head 12, through which communication is had with the casing of the well, or the tubing, or both. The casing is connected through a valve 13 with a gas supply line 14, in which a regulator 15 is disposed. The regulator 15 may be connected, if desired, so as to regulate the line pressure on either side thereof. The line 14 extends to a header line 16, to which a gas supply line 17 is connected, to the disposal well 11. A regulator 18, similar to the regulator 15, may be connected into the line 17. If desired, an additional line 19, with a regulator 19' may be connected to the header line 16 so as to supply gas thereto from an outside source. Such a supply may be utilized when the producing well, or the disposal well, or both, are at such a distance from the line 16, or have such gas pressures, as to render the laying of the lines 14 or 17, or both, not feasible. Also, the line 19 might be utilized to supply gas pressure to the disposal well through the line 17, or a separate source (not shown) of gas pressure might be utilized for such a purpose. Thus, the producing well, the disposal well, or an outside source may be utilized to supply gas under suitable pressure to either well, or to any part of the system. Also, the line 19 may be utilized to conduct excess gas from the system.

The tubing of the producing well is connected through a valve 20 to a line 21 leading to a preheater 22. The well fluid passes through the preheater 22 and is raised to a suitable temperature therein, so as to break loose emulsions, and facilitate the subsequent stratification of the free water and the oil, or emulsion, present in the well fluid. The preheating emphasizes the difference in specific gravity of the water and the oil, and renders following gas separations more efficient as is pointed out in my Letters Patent No. 2,297,297. Or, as shown in Figure 8, in cases of high gas to oil ratio wells, an oil and gas separator 24' may be supplied and the influent well stream may be passed into the separator from the line 21 and the gas removed therein be discharged to atmosphere or to the line 16 as shown through the regulator 16', while the liquids are passed through the line 21a into the line 21 beyond the valve 21b.

From the preheater, the well fluid flows through a pipe 23 into a water knockout and gas separating chamber 24. In the chamber 24, the well fluid is allowed to stratify into a water layer and an oil and/or emulsion layer. Also, the freed gas is separated and conducted from the top of the chamber through a valve 25 and a pipe 26 to the line 16. If desired, the chamber 24 may be divided into an upper gas separator chamber and a lower water knockout chamber. Also, a filter bed of excelsior or some similar material, may be disposed in the chamber to expedite the stratification of the water and emulsion and/or oil.

It is pointed out that a large majority of the free water content of the influent stream is extracted in the chamber 24. Usually from 50 to 90 per cent of the free water is extracted in this chamber, and this ordinarily represents a large portion of the water present in the well stream. Thus, a large quantity of the liquids and gas present in the well stream are removed therefrom, before direct heating of the stream for the purpose of demulsifying the same takes place. In this manner, only the necessary fluids are subsequently heated and many advantageous results, such as reduced heating expenses and reduced carbonate precipitation, and lower carbon dioxide release, are obtained.

The separated free water is drawn from the chamber 24 into a pipe 27 for disposal. The separated emulsion and/or oil is conducted from the chamber 24 through a pipe 28 to a heater 29, wherein gas or oil fired heater tubes 30 are disposed. In the heater the emulsion is broken up through the action of the heater tubes, and washed in the water present in the heater. The oil and water is allowed to stratify, and the water drawn off into the pipe 27 along with the water from the water knockout chamber 24. The oil is conducted through a pipe 31 to the preheater, where it is cooled through coils or otherwise by the influent well stream, while it is at the same time heating the well stream, and finally passes on to storage as cleaned oil. Any gas separated in the heater, is withdrawn through a valve or regulator 32 and a pipe 33 to the line 16.

It is to be noted also that suitable emulsion breaking chemicals or agents may be injected into the system at any point before the heater 29, as by pump 141 (Fig. 5). Thus, such an agent may be injected in the pipe 28 or the pipe 23, or even into the pipe 21 or well 10. Such agents may be of any desirable type such as "Tret-O-Lite," "Visco" or "Dehydro," and may include chemicals for bacteria prevention and/or algae growth, or for any purpose whereby the quality of the oil and of the water is enhanced for disposal purposes.

The water which has been separated from the oil has all, of course, been heated in the preheater, and some slight precipitation of carbonates may have taken place thereby. Also the water drained from the heater 29 has been further heated, and additional precipitation of carbonates has probably taken place. As the free water and the emulsification water are mixed in the pipe 27, the latter water, being higher in temperature, raises the overall temperature of the mixture of waters, whereby additional precipitation may occur. However, the free water is usually greatly in excess, and precipitation is held to a minimum because only the emulsification water reaches a temperature sufficient to cause appreciable precipitation. Of course, in extreme cases, considerable separation of carbonates as solids may take place throughout this first portion of the system. These precipitates must be removed before injection of the water into the disposal well, and in some instances, other salts must be removed.

The pipe 27 is provided with a laterally-extending pipe 34 carrying a valve 35, so that if necessary or desirable, the salt water may be diverted to a pit or other suitable disposal locations. Thus, the water may be diverted to allow operations on the disposal well 11, or for other reasons.

The pipe 27 extends through a valve 36 to a treating tank 37, into which the salt water is delivered from the water knockout chamber and the heater. The treating tank, or treater, 37 may be provided with a filter bed filled with excelsior or a similar material, in order to separate any remnants of oil present in the water and to filter out any additionally precipitated salts or foreign suspended matter. Such oil is drawn off automatically through a pipe 38 and a valve 39 into the pipe 31 through which it is conducted to storage. In addition, a small portion of the entrained solids may be removed from the water in this filter, and the filter may be cleaned at necessary intervals.

It is desirable to utilize a filter bed in the treater to remove any entrained solids in the water, and in some instances to remove dissolved salts. The excelsior filter may, or may not, be used in addition to the filter bed. The filter bed may be made up in the usual manner of filter sand and serves to remove solid particles from the salt water, and it is advantageous to use a very highly porous filter material, the efficiency of which will be from twenty to several hundred times as great as normal river or graded sand, and such sand when used should usually be of sufficient filtering value that no precipitate material which would clog the well bore would pass through this filter. Thus, and thereby, substantially all suspended and/or precipitated solids are removed. However, it is not anticipated to limit this process to the use of a filter bed as some waters may be of a character that filtering is not necessary. If it is desired to remove other salts, such as iron, from the salt water, reagents, such as potassium permanganate or ammonium hydroxide, may be injected into the system in advance of the filter bed to precipitate such salts. The precipitates are then filtered out on the filter bed. Also, reagents may be added to adjust the pH of the salt water and to prevent excessive corrosion.

An alternate method of removing a portion of the dissolved salts, is to form the filter bed of a special salt removing sand, such as one of the zeolites, for example, manganese zeolite which is an iron removing sand. With the use of such filter sands, the injection of reagents is not necessary. However, if desired, such reagents may be utilized to supplement the action of the special sand, or to precipitate other salts not extracted by the sand. Any reagent may be utilized to carry out known reactions which result in the precipitation of undesirable salts or constituents. The filter sand, whether ordinary sand or a special filter sand, removes solid entrained particles from the salt water. Such special filter sands may be rejuvenated and restored to effective use by the application of potassium permanganate back wash water solutions or by other means.

A pipe 40 conducts the filtered salt water to a surge tank 41 which is merely an accumulator tank, and a second pipe 42 extends from the upper end of the treater 37, through a regulator or valve 43, to the header line 16. Any gas separated in the treater may be discharged through the pipe 42, and a blanket of nonreactive gas is maintained above the liquid in the treater by means of this pipe. A similar pipe 44, having a valve 45 therein, extends from the surge tank 41 to the line 16 for similar reasons.

As the water discharges into the tank 41 and accumulates therein, it is conducted therefrom through a pipe 46 to the disposal well 11. This water is preferably conducted to the tubing of the well 11, but may, if desired, be introduced into the casing of the well. The water will ordinarily flow by gravity into the well. However, if the well does not take the water rapidly enough, or if large amounts of water are being produced, a pump 47 may be required, and is connected into a suitable by-pass 48 in the pipe 46 and may be utilized to force the water into the well 11 and the formations thereof. The pump may be adapted to operate automatically and be controlled by the liquid level in the surge tank 41 or the level in the well 11.

It sometimes becomes necessary to clean or rejuvenate the sand in the filter bed in the treater 37. A wash connection 49, having a valve 50, is provided in the tank 37 for this purpose. By closing suitable valves, the water present in the surge tank may be placed under pressure and forced through the pipe 40 and through the filter bed. This wash water flows out through the wash connection 49, carrying with it the solids retained on the filter bed. In the event special filter sands are utilized, it may be necessary to incorporate rejuvenating or revivifying agents, such as sodium chloride or potassium permanganate, in the wash water. Obviously, any suitable means may be utilized for washing the filter bed.

Gas removed from the well fluid may be conducted from the system through the header line 16 (outlet and line not shown) to storage or a gasoline plant, or any other suitable location. It is to be understood that the various devices which have been indicated in Figure 1 may be of any structure suitable for the purpose. Individual units such as the preheater 22, water knockout 24 and heater 29 may be combined, or any other suitable arrangements may be made.

Thus, a system of water disposal is had, in which the free water and the emulsification water are separated from the oil with a substantial minimum of heating and precipitation; and, in which provisions are made for preventing aeration of the well fluid, oil or water, and for electively introducing various reagents to condition the water properly for injection into a disposal well. Complete and efficient emulsion treating and water conditioning is had in one system.

In Figure 2 of the drawings, a specific structure is shown as exemplifying this system. However, the invention is not to be limited to the particular structures shown. In this figure, the numeral 51 designates an upright emulsion treater tank having a gas separating chamber 52 at its upper end. An influent pipe 53 discharges into a diverter 54 on the inner wall of the tank which causes the influent to whirl around the chamber, whereby gas is readily separated. The treater illustrated is similar to that shown in my Letters Patent No. 2,297,297, and for a detailed description reference is made thereto, but any treater suitable for the purpose may be employed.

The influent may come from a well A through a line B, or otherwise, so long as the water is not exposed to the atmosphere, and therefore it is necessary to carry a blanket of hydrocarbon or other non-reactive gas in the emulsion treating unit or system. It is desirable to preheat the influent in order to avoid excessive heating during the treating steps and also to promote free gas separation and free water extraction; therefore, the line B is connected to the lower end of a preheater 55. The influent flows upwardly through tubes 56 surrounded by hot oil, and enters the pipe 53.

The gases and gaseous fluids separated in the chamber 52 enter a scrubber 57, wherein entrained liquids are separated and discharged through a pipe 57a extending through the bottom of said chamber. The separated gas escapes through a pipe 58. The influent liquids flow from the chamber 52 down through a spreader 59 and are spread into a water knockout chamber 60, wherein the oil and free water separate and stratify. The free water overflows by way of a pipe 61 into a water discharge pipe 62 through a syphon box 62a.

The major portion of the free water content of the influent stream is extracted in the chamber 60. As stated hereinbefore, usually from 50 to 90 per cent of the water is extracted in this chamber. This extraction makes it unnecessary to heat (except for the preheating) the entire volume of water, and in some cases when the water is unusually free it may not be necessary to pre-heat any of the influent. If desired, a filter 60a, formed of excelsior or some similar material, may be disposed transversely of the chamber 60, so as to facilitate the separation of the water from the oil and emulsion.

The smaller volume of water admixed and in emulsion with the oil, which overflows into the pipe 63 extending down into the lower end of the tank, is heated in the lower portion of the tank by a heater 63a which is disposed therein. The heat which is applied to the mixture of emulsion in the lower end of the tank is dependent upon the particular well conditions.

The oil and water mixture is washed in the lower portion of the tank as explained in my Letters Patent supra, the washed oil escaping through a pipe 64 into the upper portion of the preheater 55, and the water discharging into the pipe 62 through a pipe 65 and a syphon box 65a, whereby this separated water is admixed with the free water which has been previously extracted in the chamber 60. The foregoing steps are all carried out under a blanket of hydrocarbon or other non-reactive gas and the water is not aerated. The washed oil escapes from the preheater through an outlet pipe C having connected therein a suitable outlet valve D. The pipe C leads to the usual storage tanks, or other suitable place of storage.

The water flows from the pipe 62 through a pipe 66 into the upper end of a filter tank 68. When, or if, it is desirable to add a chemical in order to precipitate entrained matter or dissolved salts, a suitable chemical pump as 139 (Fig. 6) may be employed to inject the chemicals at this point, or at some other suitable point. This pump may either be connected into the line B by a pipe or into the pipe 66, or otherwise connected in the system. A gas venting and equalizing pipe 71 is connected to the gas escape pipe 58 which has a back pressure valve 73 mounted therein, so that a predetermined pressure or vacuum may be maintained throughout the system. This may if desired be arranged in any suitable manner to maintain a gas blanket on the unit.

The filter tank 68, to which the water is conducted, may be of any desired construction, but as illustrated in Figure 2, said tank has a transverse partition 74 across its central portion. The pipe 66 extends through the wall of the tank 68 into a scrubbing chamber 75 disposed in the upper portion of the tank. The water is directed through a diverter 76 into the chamber 75, so as to scrub gas present in the water therefrom. The gas is directed upwardly and outwardly through the pipe 71 to the gas escape pipe 58, which is arranged to maintain a blanket of gas above the liquids in the tank.

The water flows downwardly and is discharged into the main portion of the upper part of the tank 68. A filter 77, formed of excelsior or some similar material, is disposed in the lower portion of the upper chamber of the tank, so that the water must pass therethrough. The filter removes some solids from the water, and tends to agglomerate oil particles present therein. The oil rises to the surface, and is drawn off through a pipe 78 to storage. The water, after passing through the filter 77, is conducted through a water leg 79 to a pipe 80 which extends into the bottom portion of the tank. Here the water contacts a spreader 81 which spreads the water over a filter bed 82 supported upon porous plates 83 which extend entirely across the lower area of the tank. The spreader assists in preventing the water from channeling through the filter bed, which may be formed of sand, or one of the zeolites, or other suitable substances, as set forth hereinbefore.

The water remains under a blanket of gas in the lower portion of the tank, since an equalizer pipe 84 is connected between the upper ends of the lower portion and the upper portion of the tank. The water, upon passing through the filter bed, is entirely freed of entrained solids, and whatever dissolved salts deemed necessary, whence it flows from the tank into a pipe 85 which is connected to a surge tank 86. The pipe 85 is split into two branches which enter the tank 86 near its bottom and near its center. Ordinarily the upper branch is utilized; however, when it is desired to rejuvenate or wash the filter bed 82 in the tank 68, the lower connection is used, so that additional wash water may be drained from the tank to be used as wash water. A back wash connection 87 is provided in which is placed a valve 87', in the wall of the tank 68, and communicates with a trough 88 which extends transversely of the upper end of the lower section above the spreader 81. Thus, wash water or rejuvenating fluid may be conducted from the tank 86, through the pipe 85 and through the filter bed in reverse flow, so as to wash or to rejuvenate the filter bed, and selectively float the filtered particles from the filter bed into the trough 88, from whence they are withdrawn through the back wash connection 87 and suitably disposed of. Very little, if any, of the filter sand will enter the trough 88, due to the high density of the sand and the rate of back wash required. An outlet pipe 89 is connected into the tank 86, through a float-operated valve 90, and extends to an input disposal well I. A by-pass 91 is formed in the pipe 89 and includes a pump 92 which is adapted to force water into the well I at such times as necessary, as when the well does not take water fast enough. A check valve 93 is mounted in the pipe 89 between the branches of the by-pass 91, so as to prevent reverse circulation through the pipe 89 when the pump is operating.

The surge tank 86 is provided with a float 94 mounted inside of the tank and connected with the valve 90 and with an electric switch 95, which in turn is electrically connected with an electric motor 96 coupled with the pump 92. When the water level reaches a predetermined point in the tank 86, the float opens the valve 90 to allow the water to flow outwardly through the pipe 69. Thus, a volume of water is maintained in the tank. Should the water level continue to rise, after the valve 90 has been opened, as would be the case when more water is produced than can flow by gravity into the well I, the additional raising of the float operates the switch 95 to start the motor 96 and the pump 92, which forces the water, under pressure, into the disposal well I. Obviously, when the water level drops in the tank 86, the pump is shut off.

A baffle 97 is disposed in the tank 86 so as to shield the float 94 from turbulence due to water entering through the pipe 89, and an equalizing gas pipe 98 is connected from the upper part of the tank 86 to the well I to equalize pressures therebetween, and has connected therein a gas supply line 100 for maintaining a blanket of gas in the system. If desired, the gas supply line 100 may be utilized to supply gas under increased pressure to the surge tank, so as to effect the back-washing of the filter bed 82. For such contingencies, a safety valve 101 is connected into the pipe 98 to prevent excess pressures being reached in the tank 86. A regulator 73' is sometimes required in the by-pass from line 100 to tank 86.

Any suitable structure may be utilized for introducing the water from the pipe 89 into the disposal well I. However, it is preferable to use the structure shown in Figure 2, and in detail in Figure 3.

Referring to Figure 3, the numeral 102 designates a hollow cylindrical housing which is mounted upon the casing 103 of the disposal well. The housing 102 is provided with an axial opening 104 in its lower end, which registers with the tubing 105 of the disposal well. A pipe 106 extends between the housing and the casing 103, so as to equalize gas pressures therebetween. The pipe 89 connects into the housing, so as to deliver treated water thereinto from the surge tank 86.

The housing is provided with an upstanding nipple or sleeve 107, which connects into the gas header line 16 through a regulator system 108 so as to equalize gas pressures in the disposal well. A cylindrical float 109 is disposed in the housing, and is provided with an axial upstanding finger or guide 110 having a conical valve member 111 on its upper end. The guide 110 is tubular, and is formed with a plurality of openings 112 near its upper end, which communicate with the interior of the guide and the float, so as to equalize pressures between the interior and exterior of the float, and thereby prevent the collapse of the latter in the presence of high pressures.

A valve seat 113 is disposed in the sleeve 107 and is adapted to be engaged by the valve member 111 of the guide 110, and thereby both limit the upward movement of the float, and prevent escape of gas or liquid through the sleeve at such times as the float is in its uppermost position.

A cable or rod or wire line 114 is attached to the lower end of the float, and extends downwardly through the tubing 105, being connected at its lower end to a relatively heavy tubular valve sleeve 115. The tubing is provided with radial ports 116 adjacent the valve sleeve 115, said ports being adapted to be closed and opened, or covered and uncovered, by the longitudinal movement of the valve sleeve in the tubing. The valve sleeve, being relatively heavy, will maintain the cable 114 taut at all times, and will be moved longitudinally as the float 109 is caused to move. The lower end 117 of the tubing is preferably closed, so that tools and equipment lost therein may be readily recovered by fishing, or by the pulling of the tubing from the well. In the event, it is desirable to leave the lower end of the tubing open, any of several well-known types of valves may be utilized in place of the valve sleeve 115.

The valve sleeve, due to its weight, is normally in its lower position, in which the ports 116 are covered, and water may not escape from the tubing. As water flows into the housing 102 from the surge tank, it enters into the tubing until the latter has been filled and a level is built up in the housing. The water in the housing lifts the float 109, raising the valve sleeve by means of the cable 114 and opening the ports, thereby allowing the water to flow from the tubing into the casing and formations of the disposal well. As long as there is a fairly continuous flow of substantial volume from the surge tank, the ports will remain open and allow water to enter into the well. As soon as the flow slackens, however, or whenever the well takes water faster than it is introduced thereinto, the ports will be closed and opened alternately by the float, so as to allow only the volume of water introduced into the housing to flow into the well formations. Thus, the tubing is maintained full of water, and, since the ports 116 are disposed below the normal fluid level in the casing of the disposal well, there is no cascading or dumping of water into an unfilled space, which might allow under some conditions the evolution of carbon dioxide from the water, with a possible and consequent precipitation of carbonates in the well.

In the event that the disposal well does not take water under gravity as fast as it is introduced thereinto, the water level will raise the float until the valve member 111 seats upon the valve seat 113. The closing of this valve prevents water from passing upwardly through the guide 110, damaging the regulator system 108, and flooding the land around the well head. Also, the closing of this valve causes a back pressure to build up in the housing 102, which forces the water level to rise in the surge tank 86, thereby actuating the float 94 in the tank and closing the switch 95 to start the pump motor 96. The pump 92, when started, overcomes the back pressure built up, and forces the disposal well to take water at a faster rate under increased pressure. The pump will continue to operate until the well begins to take water faster, or until the flow of water to the surge tank has slackened. Obviously, any desired pumping pressure may be utilized within the physical limits of the equipment being used.

In Figure 4, there is disclosed an alternate method of supplying gas to the disposal well in order to maintain a blanket of gas thereabove. This method is utilized, ordinarily, when the disposal well is at such a distance from the balance of the system, as to render the extension of the gas manifold line 16 infeasible. The sleeve 107 is connected into a T 118 into which is connected a gas regulator 119, through which gas is supplied to the disposal well from an outside source, and a back-pressure valve 120, which is set at a pressure higher than that of the regulator 119. The valve 120 allows the escape of gas from the disposal well so as to relieve excess pressures should such occur. In all other respects, the modification of Figure 4 is similar to the previously described form.

In Figures 5 and 7, a modified form of the system is shown. This form may be utilized in place of the form described above. The numeral 121 designates an upright emulsion treater tank having a gas separating chamber 122 at its upper end. An influent pipe 123 discharges into a diverter 124 on the inner wall of the tank which causes the influent to whirl around the chamber, whereby gas is readily separated. The treater illustrated is similar to that shown in my aforesaid Letters Patent, and to the tank 51 described hereinbefore and shown in Figure 2 of the drawings. However, any treater suitable for the purpose may be employed so long as the emulsion is treated under a blanket of hydrocarbon or non-reactive gas and the separation of the water from the oil is made under similar conditions, and so long as the output source of the well or wells is maintained under a blanket of hydrocarbon or non-reactive gas, so that no contamination of the influent with air may occur before, during, or after treatment.

The influent may come from a well E through a line F, or otherwise, so long as the water is not exposed to the atmosphere. It is usually desirable to preheat the influent in order to avoid excessive heating during the treating steps and also to promote gas separation and water extraction; therefore, the line F is connected to the lower end of a preheater 125. The influent flows upwardly through tubes 126 surrounded by hot oil, and enters the pipe 123.

The gases and gaseous fluids separated in the chamber 122 enter a scrubber 127, wherein entrained liquids are separated and discharged through a pipe 127a extending through the bottom of said chamber. The separated gas escapes through a pipe 128. The influent liquids flow from the chamber 122 down through a spreader 129 and are spread into a water knockout chamber 130, wherein the oil and free water separate and stratify. The free water overflows by way of a pipe 131 into a water discharge pipe 132, through a syphon box 132a.

The major portion of the free water content of the influent stream is extracted in the chamber 130. As stated hereinbefore, usually from 50 to 90 percent of the water is extracted in this chamber and this is to a large extent the greater volume of the water. This extraction makes it unnecessary to heat (except for the preheating) the entire volume of water. If desired, a filter 130a, formed of excelsior or some similar material, may be disposed transversely of the chamber 130, so as to facilitate the separation of the water from the oil and emulsion.

The smaller volume of water admixed and in emulsion with the oil, which overflows into a pipe 133, extending down into the lower end of the tank, is heated in the lower portion of the tank by a heater 133a which is disposed therein. The heat which is applied to the oil-water mixture or emulsion in the lower end of the tank is dependent upon the particular well conditions. Obviously, since the major portion of the water has been extracted or "knocked out" in the chamber 130, it is necessary to heat (other than preheating) only the residual water, whereby a material saving in heating expenses is realized.

The oil and water mixture is washed in the lower portion of the tank as explained hereinbefore, the washed oil escaping through a pipe 134 into the upper portion of the preheater 125, and the water discharging into the pipe 132 through a pipe 135 and a syphon box 135a, whereby this separated water is admixed with the free water which has been previously extracted in the chamber 130.

The foregoing steps are all carried out under the blanket of gas and the water is not aerated. The pipe 128 serves as a gas manifold line or equalizing line, and maintains a blanket of gas over the oil and water throughout the system. A pipe 136 with regulator 136' connects the well E to the pipe 128 so as to equalize pressures if desired, and to assure the presence of a non-reactive gas blanket throughout the system. If desired, the well E may be utilized to supply gas for the system.

The washed oil escapes from the preheater through an outlet pipe G having connected therein a suitable outlet valve H. The pipe G leads to the usual storage tanks S, or other suitable place of storage.

The water flows from the pipe 132 through a pipe 137 into the upper end of a filter tank 138. Where it may be desirable to add a chemical in order to precipitate entrained matter or dissolved salts, a suitable chemical pump 139 may be employed to inject the chemicals at this point, or hereinbefore, or hereinafter, or in advance of heating at any suitable point, or wherever best results can be obtained. This pump may be connected into the line 137 by a pipe 140, or a second pump 141 may be utilized to inject chemicals into the pipe F by way of a pipe 142; or, other pumps may be otherwise connected into the system.

Gas venting and equalizing pipes 143 and 144 are connected to the gas manifold pipe 128 from the pump 139 and the filter tank 138. The line 128 has a back pressure valve 145 mounted therein, so that a predetermined pressure or a blanket of previously described gas may be maintained throughout the system.

The filter tank 138, to which the water is conducted, may be of any desired construction, but as illustrated in Figure 5, said tank has an upright partition 146 across its central portion having a deflector 147 at its upper end, bent to overhang the discharge side of said tank in close proximity to the roof of the tank. Gas from either side may escape through the pipe 144 and pressure is equalized through said pipe, a blanket of non-reactive gas being maintained thereby. A transverse tray 148 inclines toward the partition just below the inlet from the pipe 137. The lower edge of this tray overhangs a similar tray 149 which inclines toward the tank wall from the partition. These trays have upstanding baffles 150, as shown in detail in Figure 7. These baffles may be staggered so as to cause the liquids to take a circuitous path, whereby injected chemicals will be thoroughly admixed with the salt water.

On the outlet side of the partition the filter tank has an outlet pipe 151 connected with a pump 152. A liquid level is carried just below the tray 149 by means of a float 153 mounted on the side of the tank and connected with an electric switch 154, which in turn is electrically connected with an electric motor 155, or any other type of prime mover, coupled with the pump. When the water rises above the normal level and raises the float, the motor will be started by the closing of the switch, whereby water will be pumped out of the filter tank, so that at no time will the filter tank be flooded.

Filter cells 156, formed by foraminous plates 157 extending from the partition 146 to the tank wall, may be filled with any material suitable for the purpose, such as excelsior, fuller's earth, clay, gravel, fine or coarse sand, or the like. It is to be understood that the water flowing from the treater tank 121 through the pipes 132 and 137 will be warm or hot, according to preceding temperatures. Solids and extraneous matter will precipitate, filter and settle out of the water in the filter tank. The water which passes up from the filter cells, will be more or less free from objectionable solids, according to previous treatment.

The filtered water is discharged from the pump 152 through a pipe 158 which is preferably connected to an input disposal well I. It is desirable, as pointed out hereinbefore, that the well I be located in the same horizon from which the water was produced, so as to provide a water drive to assist in the subsequent production of oil and to maintain the pressure and liquid volume of the producing reservoir at its highest possible point. However, the invention is not to be limited to the disposal well being in the same horizon, as said well could be remote therefrom. The use of the pump 152 is optional, for it would be possible to return the water by means of the pressure maintained in the system and the pressure conditions of the input well. Also, when a pump is employed, it is not necessary that it be automatically and electrically controlled, as illustrated, for any suitable pump may be used.

As has been pointed out above, the filter tank to which the salt water is conducted may be of any desired construction and, in Figure 6, a modified form of tank is illustrated. This tank 238 is formed with an upright partition 246 which extends across its central portion and which is similar to the partition 146 of the first form. The upper end of the partition 246 terminates short of the top of the tank, whereby the gas on each side of the partition may be equalized. The water outlet pipe 137, which leads from the treater, may have a suitable mixer 237 connected therein. Instead of connecting into the side wall of the tank, as in the first form, the pipe 137 is connected into the top of the tank at one side thereof, whereby the liquids entering the interior of the tank are directed downwardly into contact with a plurality of mixing trays 248, which trays are similar to the trays 148 and 149 of the first form shown in Figure 5. Each tray 248 is provided with upstanding baffles 250 and these baffles are preferably staggered so as to cause the incoming liquids to take a circuitous path and thereby thoroughly admix the injected chemicals with the salt water.

The liquids pass downwardly in the tank and then are conducted upwardly through a vertical pipe 159 which extends upwardly to the upper portion of the tank. A lateral spray pipe 160 has connection with the upper end of the pipe 159 and overlies a plurality of filter cells 256, which are formed by foraminous plates 257 extending from the partition 246 to the tank wall. The filter cells may be filled with any material suitable for the purpose and, manifestly, the water is discharged downwardly from the spray pipe 160 and passed through the filters. It is preferable that the material within the filter cells be sand and gravel which is progressively coarser toward the lower filter element, but the invention is not to be limited to such material; also, various types of filter sand, such as special salt-removing sands may be utilized.

An outlet pipe 251 is connected in a transverse plate 161, which extends from the bottom of the partition 246 to the tank wall and which serves as a bottom for the chamber within which the filter cells are mounted. The water which has passed through the filter cells accumulates in the bottom of the chamber and may flow downwardly through the outlet pipe 251. For controlling the flow through the pipe 251, a control valve 162 is connected in the pipe. The operation of this valve is controlled through suitable linkage 163 by a float 253, which is located in the upper end of the chamber above the filter cells. A suitable hood 164 encloses the float and has a vent pipe 165 extending upwardly to the top of the tank. A pipe 258 leads from the control valve 162 and to the input well I. If desired, a suitable pump (not shown) may be connected in the pipe 258. A pipe 259 with regulator 259' extending from the well head may be connected to a source of inert or non-reactive gas so that at all times a blanket of gas will be present at the input well head, or the pipe 129 may be extended so as to join the pipe 259 for such purposes. It will be obvious that the float 253 maintains a predetermined water level within the filtering chamber and whenever said level rises above a predetermined point, the valve 162 is opened to discharge water into the input well. If desired, a syphon or any other suitable arrangement may be utilized to control the flow through the pipe 251.

The operation of this form of filter tank is substantially the same as the operation of the form hereinbefore described. The water which flows from the treater tank 121 through the pipe 132 is warm or hot, according to the preceding temperature. Solids and entrained matter will precipitate, filter and settle out of the salt water in the filter tank. The salt water which flows downwardly from the filter cells will be more or less devoid of minerals or salts down to a certain per cent and this water is returned to the producing formation.

A pipe 165 is connected from the disposal well I to the gas manifold pipe 128, so as to maintain a blanket of gas in the well I and prevent aeration of the water, and precipitation of solids therefrom, after the water has been introduced into the well. If desired, a valve and float structure similar to that shown in Figures 2 and 3 of the drawings may be utilized in conjunction with the last described form of the invention, shown in Figures 5–7.

In Figure 9, there is shown a simplified form of the invention in which a filter or filters are not used. Of course, if desired, filters may be incorporated into this form in the surge tank, or therebefore.

The well stream is produced from a well 300 and flowed through a treater 301 in much the same fashion as in the systems shown in Figures 2 and 5, and described hereinbefore, the treater 301 being similar in all respects to the treaters 51 and 121. The free water is knocked out of the well stream in the treater, and any emulsion present therein is broken so as to release emulsification water. The cleansed oil is drawn off through the pipe 302, while the combined waters are removed from the treater through a pipe 303.

The well and the treater are maintained under a blanket of inert or non-reactive gas by a header pipe 304 connected thereto.

The water pipe 303 extends into a horizontal surge or accumulator tank 305, said pipe projecting through the end of the tank into a vertical conduit or flume 306 disposed within the tank. The flume 306 is secured to the upper side of the tank and extends toward the bottom thereof, terminating with an open end short of the bottom, so that influent water is directed downwardly in the tank from the pipe 303. A plurality of radial gas ports or vents 307 are formed in the flume near its upper end, so that gas may escape from the flume into the tank proper. The flume extends below the water level of the tank so that gas is trapped therein and it is necessary to provide a means of escape. Although the gas could escape through the open lower end of the flume, it would create turbulence in doing so, and it is considered advantageous to provide gas escape means which prevents such turbulence with its accompanying detrimental effects. Also, the discharge of the water below the water level eliminates splashing and turbulence which would result in gas release and precipitation of carbonates, etc.

A pair of oil trap baffles are disposed at the opposite end of the tank 305, and extend transversely of the tank. The upper baffle 308 depends from the upper side of the tank to a point below the water level, i. e., to a point spaced between the longitudinal axis of the tank and the bottom thereof. The lower baffle 309 is spaced laterally of the upper baffle so as to be nearer the end of the tank and to provide a flow space between the baffles, said lower baffle extending upwardly from the bottom of the tank to a point considerably above the lower edge of the baffle 308. In this manner, water may flow upwardly between the baffles into the end-portion of the tank, while oil which may have separated and floated to the surface of the water is held by the upper baffle 308. All flow is from a point below the lower edge of the upper baffle, and this lower edge is disposed so as to always be below the water level, so that only water passes into the end-portion of the tank. Under ordinary conditions, there is never sufficient oil in the tank to force the water level below this point. An oil skimmer 310 is positioned in the upper part of the tank so as to remove oil through a pipe 311 extending through the bottom of the tank.

The end-portion of the tank 305, between the baffle 309 and the end wall of the tank, forms a float chamber in which a float 312 is disposed. The float 312 operates a valve 313 connected into a discharge pipe 314 which leads from the bottom of the float-chamber. The pipe 314 is connected into the disposal well 315 in any suitable fashion. For instance, the structure shown in Figures 2 and 3 may be utilized. As the water level rises in the float-chamber and raises the float, the valve 313 is opened so as to drain the water into the disposal well. As the water level in the float-chamber falls, the float is lowered to close the valve and shut off flow.

The disposal well 315, the float-chamber and the tank 305 are all connected to a pipe 316 which extends into the gas header pipe 304, so that the entire system is maintained under a blanket of inert or non-reactive gas. A gas supply line 317 is connected into the pipe 316 through a regulator 318 so as to supply the blanket of gas, and a back pressure valve 319 is connected into the line 304 so as to prevent the occurrence of excessive pressures.

This modification, shown in Figure 9, is a simplified form of the invention in that only the treater and the surge tank are utilized. It is adopted primarily for use with waters which are relatively stable under well conditions, and which need not be filtered or treated extensively prior to disposal. Suitable chemicals may be injected at any desirable point to further stabilize the water, or to aid in emulsion breaking. However, if precipitation chemicals are added, filtering means must be provided. Such means may be in the treater or in the surge tank.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. A filtering tank for a salt water disposal system including, an upper chamber having a water inlet, a lower chamber, a pressure equalizing pipe extending from the upper chamber to the lower chamber, a filter in the upper chamber, means for maintaining a water level in the upper chamber, a filter bed in the lower chamber, a water discharge pipe leading from the upper chamber from below the filter therein and discharging in the lower chamber above the filter bed therein, and a water discharge pipe leading from the lower chamber below the filter bed thereof.

2. A filtering tank as set forth in claim 1, with means in the upper chamber for skimming oil from the water therein, and means for carrying off the skimmed oil.

3. A filtering tank as set forth in claim 1, wherein the upper chamber has a gas inlet.

JAY P. WALKER.

REFERENCES CITED

The following references are of record in the file of this patent:

UNITED STATES PATENTS

| Number | Name | Date |
|---|---|---|
| 473,013 | Moore | Apr. 19, 1892 |
| 572,814 | Morrow | Dec. 8, 1896 |
| 840,381 | Sawdon | Jan. 1, 1907 |
| 885,516 | Polzin | Apr. 21, 1908 |
| 911,314 | Maranville | Feb. 2, 1909 |
| 1,199,266 | Grant | Sept. 26, 1916 |
| 1,535,768 | Davis | Apr. 28, 1925 |
| 1,557,103 | Smith | Oct. 13, 1925 |
| 1,580,791 | Peters | Apr. 13, 1926 |
| 1,922,714 | Ridley | Aug. 15, 1933 |
| 2,016,642 | Lincoln | Oct. 8, 1935 |
| 2,152,779 | Wagner | Apr. 4, 1939 |
| 2,194,616 | Schoeneck | Mar. 26, 1940 |
| 2,206,835 | Combs | July 2, 1940 |
| 2,231,269 | Holmes | Feb. 11, 1941 |
| 2,261,057 | Erwin | Oct. 28, 1941 |
| 2,261,100 | Erwin | Oct. 28, 1941 |

FOREIGN PATENTS

| Number | Country | Date |
|---|---|---|
| 16,710 | Great Britain | July 30, 1903 |